(12) United States Patent
Woods

(10) Patent No.: US 7,795,548 B2
(45) Date of Patent: Sep. 14, 2010

(54) WEIGHING SERVING IMPLEMENT

(76) Inventor: Charles Woods, 505 Iroquois Shore Road, Unit 6, Oakville, ON (CA) L6H 2R3

( * ) Notice: Subject to any disclaimer, the term of this patent is extended or adjusted under 35 U.S.C. 154(b) by 86 days.

(21) Appl. No.: 11/944,553

(22) Filed: Nov. 23, 2007

(65) Prior Publication Data

US 2009/0133940 A1 May 28, 2009

(51) Int. Cl.
*G01G 19/56* (2006.01)
*G01G 23/02* (2006.01)

(52) U.S. Cl. .................... 177/131; 177/148; 177/157

(58) Field of Classification Search ............. 177/131, 177/148, 149, 157, 245
See application file for complete search history.

(56) References Cited

U.S. PATENT DOCUMENTS

| | | | | |
|---|---|---|---|---|
| 258,476 A * | 5/1882 | Roberts | ...................... | 177/131 |
| 327,152 A * | 9/1885 | Fitch | ...................... | 177/127 |
| 412,049 A * | 10/1889 | Side | ...................... | 177/149 |
| 537,743 A * | 4/1895 | Bergquist | ...................... | 177/131 |
| 570,434 A * | 10/1896 | Johnson | ...................... | 177/149 |
| 578,642 A * | 3/1897 | Joslyn | ...................... | 177/149 |
| 734,653 A * | 7/1903 | Alexandrer | ...................... | 177/149 |
| 748,856 A * | 1/1904 | Fox | ...................... | 177/131 |
| 781,920 A * | 2/1905 | Taylor | ...................... | 177/149 |
| 784,641 A * | 3/1905 | Taylor | ...................... | 177/149 |
| 807,334 A * | 12/1905 | Swank | ...................... | 177/149 |
| 852,188 A * | 4/1907 | Howe | ...................... | 429/96 |
| 872,961 A * | 12/1907 | Neddo | ...................... | 177/149 |
| 1,266,881 A * | 5/1918 | Taylor | ...................... | 177/131 |
| 2,129,564 A * | 9/1938 | Chandler | ...................... | 177/148 |
| 2,333,385 A * | 11/1943 | Le Bert | ...................... | 177/131 |
| 3,057,421 A * | 10/1962 | Fann | ...................... | 177/149 |
| 3,121,466 A * | 2/1964 | Mittelsteadt | ...................... | 177/157 |
| 3,159,226 A * | 12/1964 | Mittelsteadt | ...................... | 177/157 |
| 3,968,849 A | 7/1976 | Dale et al. | | |
| 4,347,905 A * | 9/1982 | Berckes | ...................... | 177/149 |
| 4,744,428 A | 5/1988 | Knotter et al. | | |
| 4,961,472 A * | 10/1990 | Pratt | ...................... | 177/216 |
| 5,576,521 A | 11/1996 | Dubach | | |
| 6,236,001 B1 * | 5/2001 | Shymko | ...................... | 177/149 |
| 6,268,573 B1 * | 7/2001 | Hartselle, III | ...................... | 177/148 |
| 6,509,534 B1 | 1/2003 | Thadani | | |
| 6,573,462 B1 * | 6/2003 | Shymko | ...................... | 177/149 |
| D565,445 S * | 4/2008 | Shymko | ...................... | D10/87 |
| 2007/0034421 A1 | 2/2007 | Ho et al. | | |

FOREIGN PATENT DOCUMENTS

| | | | | |
|---|---|---|---|---|
| DE | 3831420 A1 * | 3/1990 | ................ | 131/78 |
| DE | 3905097 A1 * | 8/1990 | ................ | 702/57 |
| DE | 102005062980 A1 * | 3/2007 | | |
| EP | 34571 A2 * | 8/1981 | ................ | 177/149 |
| JP | 59-67425 A * | 4/1984 | ................ | 177/211 |
| JP | 59/077315 A * | 5/1984 | ................ | 73/426 |
| JP | 63/005221 A * | 6/1986 | | |
| JP | 03-96822 A * | 4/1991 | ................ | 177/163 |
| JP | 03-96823 A * | 4/1991 | ................ | 294/1.1 |
| JP | 2004/156954 A * | 6/2004 | | |

* cited by examiner

*Primary Examiner*—Randy W Gibson
(74) *Attorney, Agent, or Firm*—Philip C. Mendes da Costa; Bereskin & Parr LLP/S.E.N.C.R.L., s.r.l.

(57) ABSTRACT

A weighing serving implement is disclosed. The weighing serving implement has a head to serve food and is mounted to a mount at a pivot point. The pivot point provides a mechanical balance and facilities a rugged and washable design.

28 Claims, 4 Drawing Sheets

WEIGHING SERVING IMPLEMENT

FIELD OF THE INVENTION

The invention relates to serving implements. More specifically, the invention relates to spoons, forks and the like which weigh material to be served.

BACKGROUND OF THE INVENTION

In the fast food industry, it may desired to prepare sandwiches with a given amount sandwich filling. Typical serving implements, such as a spoon or scoop, address this need by dispensing a given volume of food. For example, a typical serving implement such as a spoon or scoop may include a head that holds 15 mL. Therefore, if a user fills the entire volume of a spoon head or scoop to the top, 15 mL of material will be served. The material to be served may be a liquid or a solid, such as tuna salad or cheese. Such materials may not fill the entire volume of the head, and may mound over the top of the head. These implements provide a quick means of approximating the amount of material that is provided per serving.

Another approach is disclosed in United States Patent Application Publication 2007/0034421 to Ho et al., which describes a weighing spoon. The spoon comprises a head for holding the material to be served, and a stem extending from the head. The stem includes a battery powered electronic weighing sensor, and an LCD display on the top of the stem for displaying the weight. In order to use the spoon, the user places the material in the bowl, holds the stem in a horizontal position, and reads the weight from the LCD display.

U.S. Pat. No. 5,576,521 to Dubach discloses another weighing implement. The implement is a ladle with a scoop, and as such, when material is held in the bowl, the stem of the ladle extends vertically. The stem includes a spring scale, which displays the weight of the material in the bowl when the stem is held or hung from the end distal to the bowl.

SUMMARY OF THE INVENTION

In accordance with this invention, there is provided an implement, which may be a spoon, fork, spork or the like, which is configured to permit a user to withdraw food from a container and to deliver the food to a point of use, such as a slice of bread that is used to make a sandwich. The implement incorporates a pivot point so as to function as a mechanical balance to determine the weight of food placed in the head of the serving implement. Accordingly, if the implement is a spoon, a user may use a handle to manipulate the spoon to withdraw food from a container and, while still holding the spoon and orienting the spoon generally horizontally, determine if the amount of food withdrawn is the desired amount by watching, e.g., the resting position of the head.

In one broad aspect, a weighing serving implement is provided. The weighing serving implement comprises a mount, and a serving implement. The serving implement comprises a head, and a stem extending from the head. The stem is pivotally mounted to the mount about a pivot point. A counterweight is associated with the stem.

Serving implements in accordance with this broad aspect may be advantageous because they may be resistant to heat and water, and therefore may be dishwasher safe. Further, serving implements in accordance with this broad aspect may be sterilizable.

Additionally, serving implements in accordance with this broad aspect may be advantageous because they may allow a user to dispense a given amount of food, without requiring that the user remember or even know the amount of food to be dispensed. That is, some embodiments of the serving implement may have a fixed counterweight. A user need only select the correct serving implement and ensure that the serving implement has pivoted to a given position, for example to the horizontal, to know that the correct amount of food is in the head of the serving implement. This may be particularly advantageous in situations wherein the user is required to dispense a variety of different materials at a variety of different weights. In such situations, the user may have a plurality of serving implements, each having a different counterweight, and use one serving implement for each different material. Therefore, the user needs only to remember to use a given serving implement for a given material, without remembering the amount of each material to be served. For example, a set of serving implements having different preset counterweights may be provided and marked with the preset counterweights, e.g., 50 g, 100 g, 250 g, etc. Each member of the set may have a different colour (e.g., yellow for 50 g, blue for 100 g, etc.) They may also be coded for different types of food, or different size servings, e.g., colour coded or labeled with food type or serving size. Therefore, a user need only pick up the correct implement, place food on the implement and determine if the food is correctly counterbalanced prior to using the food contained by the implement.

In some embodiments, the mount comprises a longitudinally extending housing. Such embodiments may be advantageous because the mount may provide a comfortable handle for the serving implement.

In some embodiments, the mount has a front end, a rear end, and first and second longitudinally extending opposed sides, and the head is provided at the front end.

In some embodiments, the mount has first and second longitudinally extending opposed sides, and the stem is pivotally mounted to the first and second longitudinally extending opposed sides.

In some embodiments, the mount has a front end and a rear end, the head is provided proximate the front end, the stem comprises first and second portions on opposed sides of the pivot point, the first portion is positioned between the head and the pivot point and the counterweight is provided on the second portion.

In some embodiments, the mount comprises a lower surface configured to provide a stable platform when the weighing serving implement is positioned on a flat surface. Such embodiments may be advantageous in situations wherein a user desires a particular amount of accuracy in determining the weight of material in the head. In such situations, the user may place the lower surface on a flat surface, such as a countertop, to ensure that the mount is horizontal when the weight is determined.

In some embodiments, the mount is configured for manipulating the head.

In some embodiments, the stem comprises first and second portions on opposed sides of the pivot point, and the counterweight is associated with the second portion.

In some further embodiments, the second portion is the counterweight.

In other further embodiments, a part of the second portion extends beyond the mount and the counterweight is provided on the part of the second portion that extends beyond the mount. In yet a further embodiment, the counterweight is provided on a lower surface of the part of the second portion that extends beyond the mount.

In some further embodiments, the mount has first and second longitudinally extending opposed sides defining a cavity therebetween and the counterweight is provided on a part of the second portion that extends adjacent the opposed sides. In yet a further embodiment, the counterweight is provided on a lower surface of the part and is positioned to be received in the cavity.

In some further embodiments the counterweight is movable along the second portion. In yet a further embodiment, the second portion comprises a scale. Such embodiments may be advantageous because they may allow a user to accurately measure the weight of a material or to set the desired weight. Of food to be served.

In some embodiments, the weighing serving implement further comprises a level. Such embodiments may be advantageous because the level may aid the user in determining, e.g., if the stem and/or the mount of the serving implement is level when the weight is determined.

In some embodiments, the mount comprises a housing surrounding at least a portion of the stem, the head is provided at a front end of the housing and the front end of the housing has an opening through which the stem extends.

In some embodiments, the counterweight is removably positioned on the stem. Accordingly, in such embodiments, at least two counterweights having different weights that are removably mounted on the stem may be provided.

In some embodiments, the mount comprises an upper surface, and the stem comprises first and second portions on opposed sides of the pivot point, and the serving implement is configured such that when the serving implement is balanced about the pivot point, the second portion is aligned with the upper surface when the upper surface is disposed horizontally.

In some embodiments, the weighing serving implement is a spoon, and the head comprises a bowl.

In accordance with another broad aspect, a weighing serving implement is provided. The weighing serving implement comprises a serving implement comprising a head and a stem extending from the head. The stem is pivotally mounted to a handle about a pivot point. The weighing serving implement further comprises a mechanical counter force providing member configured to provide an opposing force to a downward force provided by contents supported by the head.

In some embodiments, the handle comprises first and second longitudinally extending sides and at least a portion of the stem extends between the opposed sides. In further embodiments, the handle comprises a lower flat surface. In further embodiments, the second portion is receivable between the opposed sides.

In some embodiments, the stem comprises first and second portions on opposed sides of the pivot point.

In some embodiments, the counter force-providing member comprises a biasing member.

In some embodiments, the weighing serving implement comprises a weighing spoon, and the head comprises a bowl.

BRIEF DESCRIPTION OF THE DRAWINGS

These and other advantages of the present invention will be more fully and particularly understood in connection with the following description of the preferred embodiments of the invention in which.

DETAILED DESCRIPTION OF THE INVENTION

Figure 1:
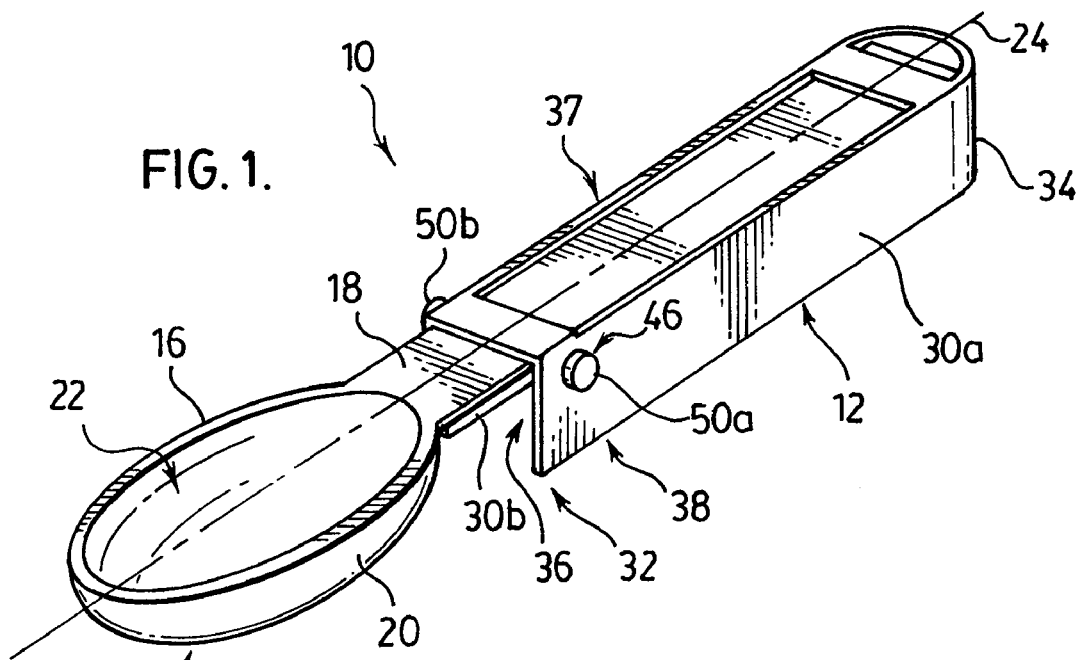
FIG. 1 is a perspective view of an embodiment of a weighing serving implement of the present invention.

Referring to FIG. 1, an embodiment of a weighing serving implement 10 of the present invention is shown. Weighing serving implement 10 comprises a mount 12, and a serving implement 14 pivotally mounted to mount 12. In the embodiments shown, serving implement 14 is a spoon. In other embodiments, serving implement 14 may be another implement, for example a fork, a slotted spoon, a spoon without holes, a spork, a spoodle, or a spatula.

Figure 2:
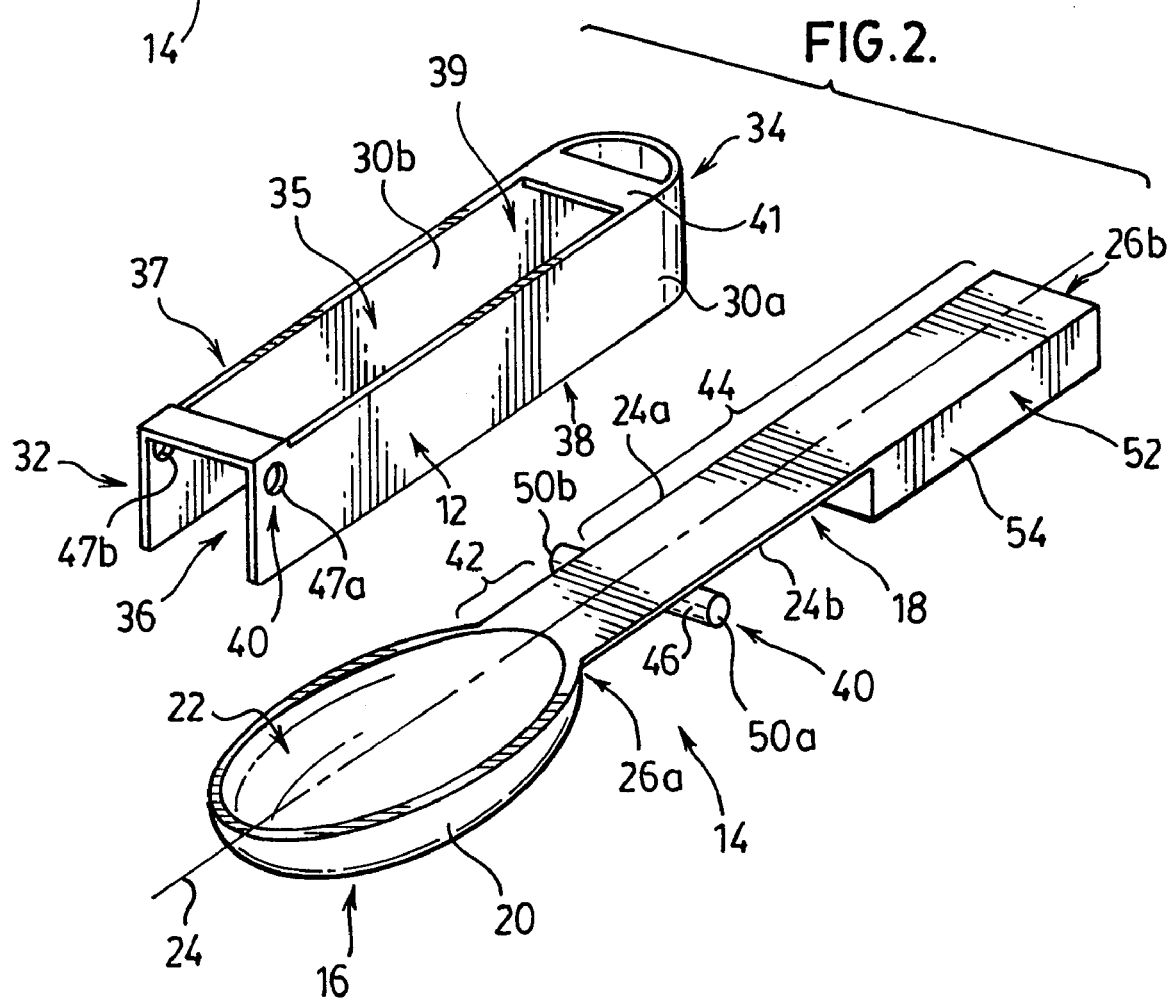
FIG. 2 is an exploded view of the weighing serving implement of FIG. 1.

Referring to FIG. 2, serving implement 14 comprises a head 16, and a stem 18. In embodiments wherein serving implement 14 is a spoon, head 16 may comprise a bowl 20, with or without holes. In other embodiments, head 16 may comprise tines of a fork or the like. Head 16 is the part of the implement that holds the food while it is weighed. An advantage of this invention is that the same implement that serves the food also functions to weight the food. Also, given that the device is mechanical, it may be immersed in water and/or heated.

If head 16 is a bowl, then bowl 20 is configured for holding or containing food or other material and may comprises an upper opening 22, which may define a plane. In the embodiment shown, bowl 20 is rounded, and upper opening 22 is ovoid. In other embodiments, bowl 20 and upper opening 22 may be another shape. For example, bowl 20 may be cylindrical, having a tubular outer wall and a circular base, and upper opening 22 may be circular. Bowl 20 may be of any desired volume. For example, in some embodiments, bowl 20 may have volume of from 15 ml to 100 ml. In one particular embodiment, bowl 20 has a volume of about 30 ml. The volume may be selected based on the weight of food to be held in bowl 16. For example, the volume may be selected to hold 3-5 oz of meat. Further, if the bowl is to withdraw solid food from a liquid (e.g., pickles from pickling juice), then bowl 16 may have one or more holes and may incorporate a strainer or be a slotted spoon.

Stem 18 extends from head 16. Stem 18 may be any member extending from head 16. In the embodiment shown, stem 18 is substantially rectangular, having first and second sides 24a, 24b, and front 26a and rear 26b ends. Stem 18 may be of any desired length. For example, in some embodiments, stem 18 may be between 5 inches and 15 inches in length. In one particular embodiment, stem 18 is 13 inches in length. Stem 18 extends along axis 25, which may be parallel to the plane defined by upper opening 22. In other embodiments, axis 25 may be at an angle with respect to the plane defined by upper opening 22. Furthermore, in some embodiments, stem 18 may be bent or curved, and therefore may not extend along a straight axis. In the preferred embodiment, stem 18 extends integrally from head 16. In alternate embodiments, stem 18 may be affixed to bowl 20, for example by screws. It will be appreciated that stem 18 need not be secured to the upper part of head 16 but to any portion thereof.

Figure 5:
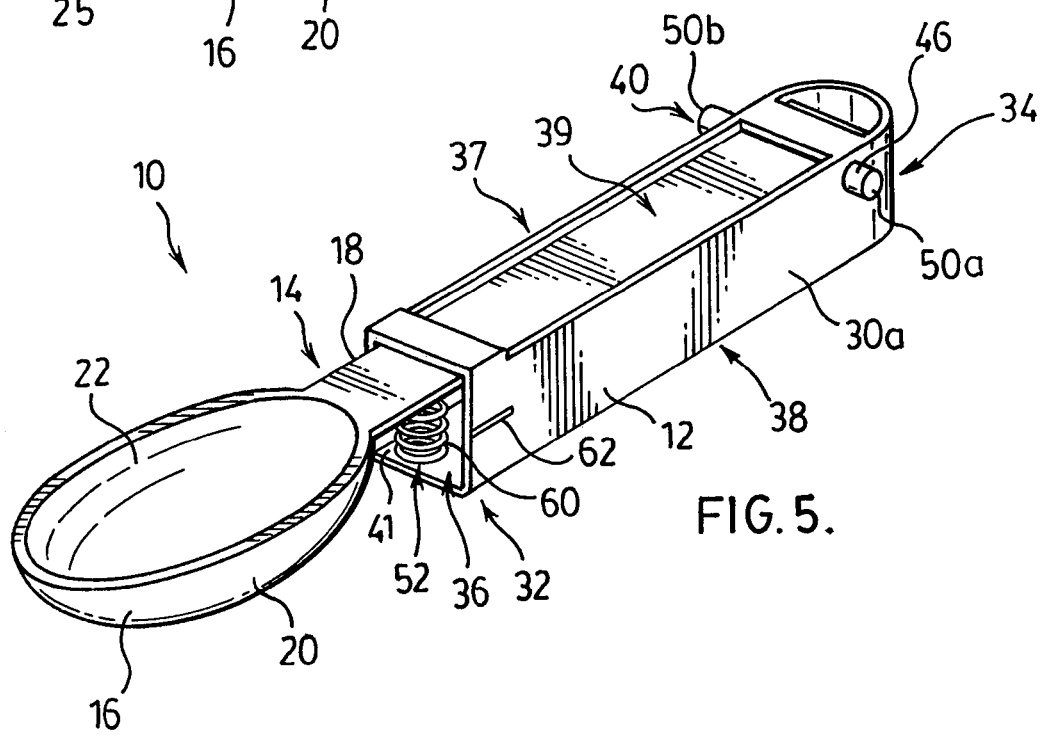
FIG. 5 is a perspective view of a fourth embodiment of a weighing serving implement of the present invention; and, FIG. 6 is an exploded view of the weighing serving implement of FIG. 5.
Figure 6:
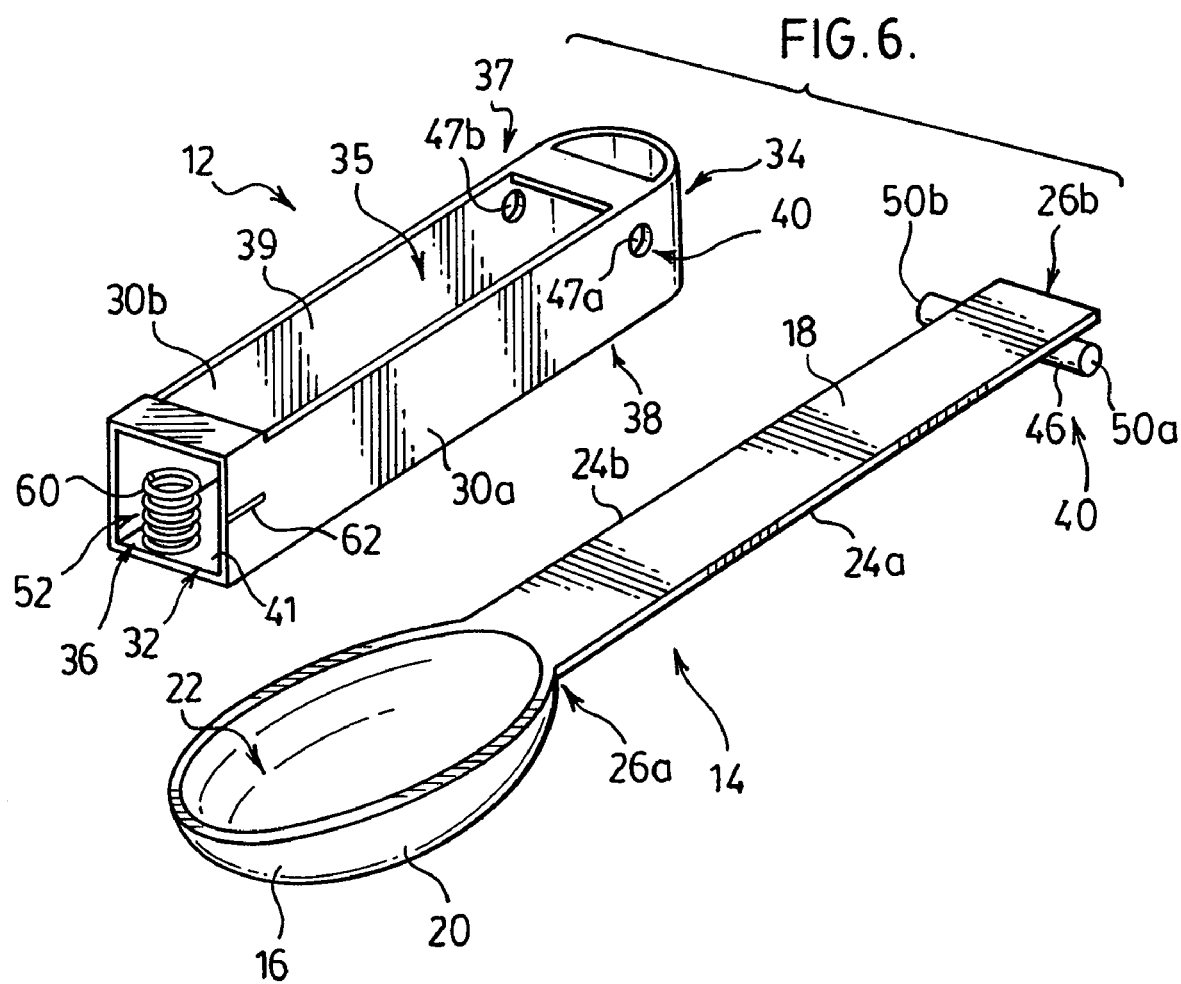

Serving implement 14 is pivotally mounted to mount 12 at a pivot point 40. In the embodiments of FIGS. 1-4, pivot point 40 is located on stem 18 at a point between ends 26a and 26b. In such embodiments, stem 18 is divided into two portions by pivot point 40: a first portion 42 extends between front end 26a and pivot point 40, and a second portion 44 extends between pivot point 40 and rear end 26b. In an alternate embodiment, as will be described further hereinbelow and as shown in FIGS. 5 and 6, pivot point 40 is located adjacent rear end 26b of stem 18. In a further alternate embodiment (not shown) pivot point may be at the junction of head 16 and stem 18.

Weighing serving implement 10 is configured such that in use, head 16 is loaded with a material, for example by scooping an amount of food, and then mount 12 is held or positioned such that serving implement 14 is allowed to pivot about pivot point 40 and come to rest. Accordingly, mount 12 may be any structure, which allows serving implement 14 to pivot about pivot point 40.

Figure 3A:
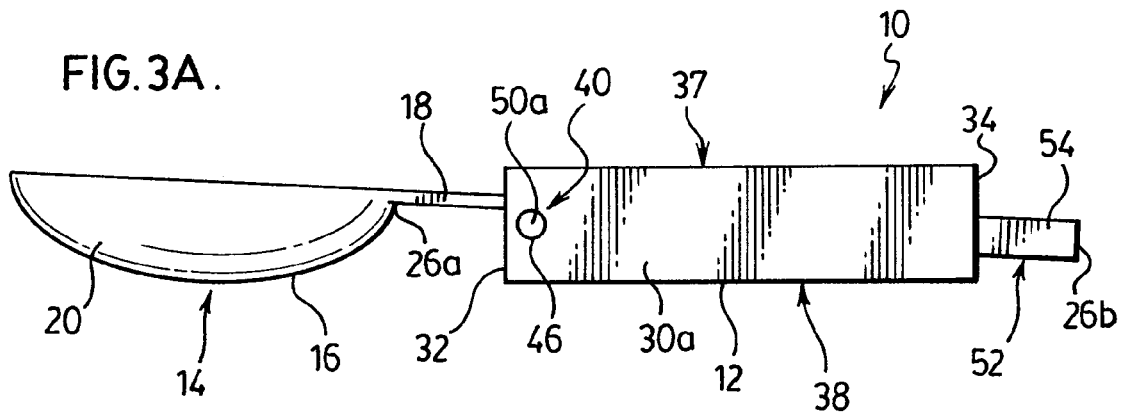
FIG. 3A is a top view of a second embodiment of a weighing serving implement of the present invention.
Figure 3B:
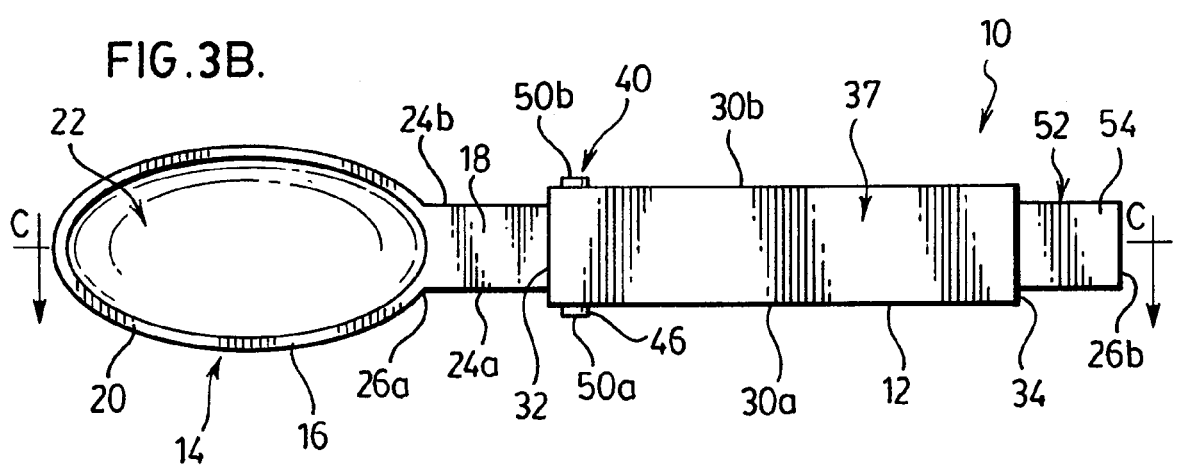
FIG. 3B is a side view of the weighing serving implement of FIG. 3A.
Figure 3C:
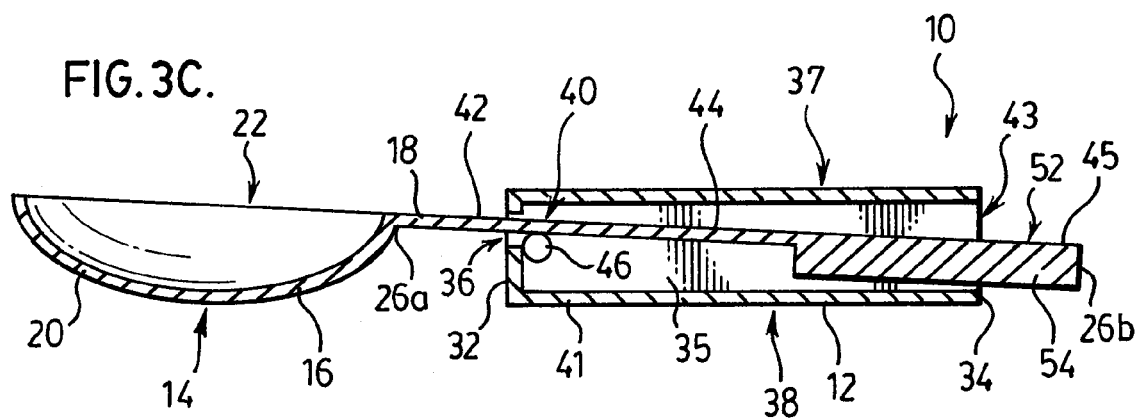
FIG. 3C is a longitudinal cross section taken through line C-C in FIG. 3B.
Figure 4:
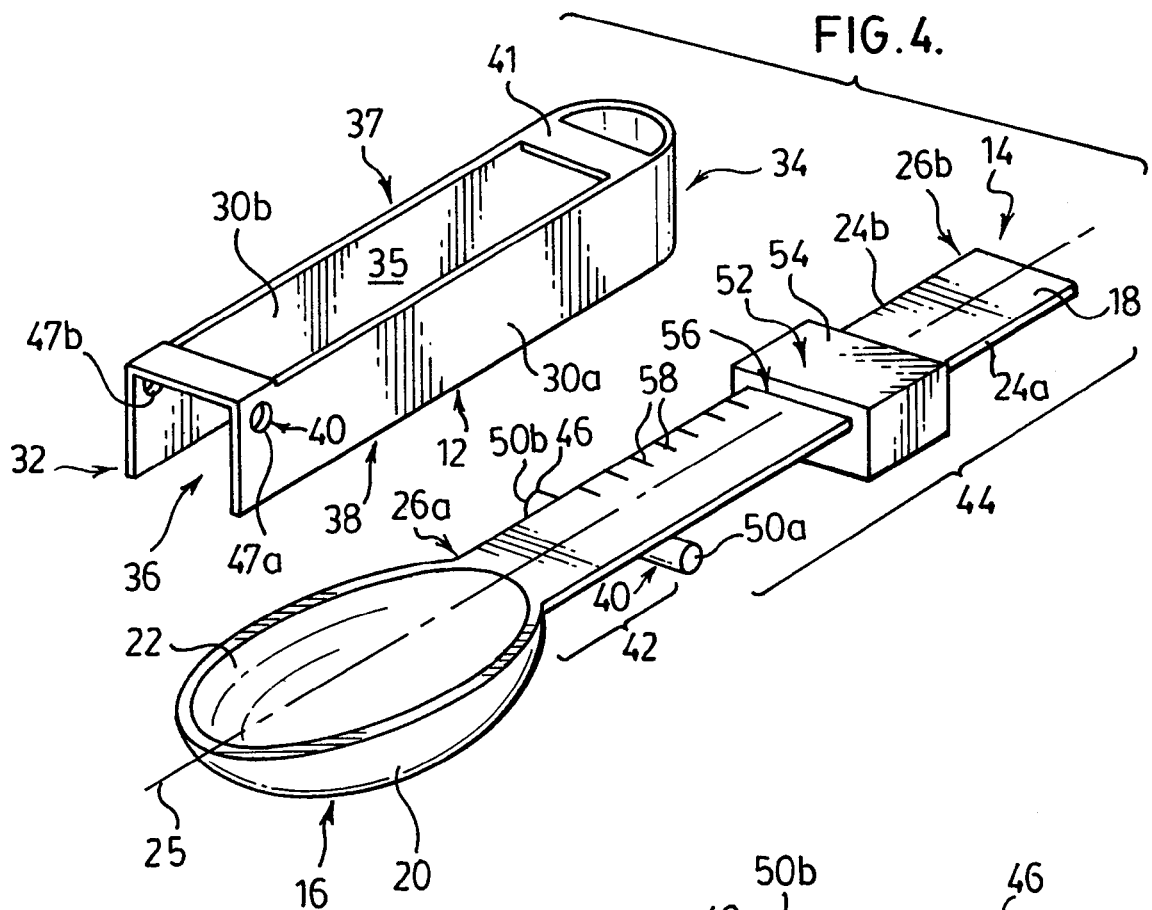
FIG. 4 is an exploded view of a third embodiment of a weighing serving implement of the present invention.

In the preferred embodiment of FIGS. 1 and 2, mount 12 is a housing, through which a portion of stem 18 extends, and provides a handle for manipulating weighing serving implement 10. In the embodiment shown, mount 12 is longitudinally extending, having first 30a and second 30b longitudinally extending sidewalls, a front end 32, and a rear end 34. Stem 18 is positioned in a cavity 35 defined between sidewalls 30a and 30b. Front end 32 has an opening 36, through which stem 18 extends, such that head 16 is preferably proximate front end 32. In the embodiment of FIG. 1, rear end 26b of stem 18 is received within cavity 35 of mount 12. In an alternate embodiment, as shown in FIGS. 3A-3C, rear end 34 of mount 12 may further comprise an opening 43 through which stem 18 extends, such that a portion 45 of stem 18 extends rearwardly beyond mount 12.

Mount 12 further comprises an upper end 37 and lower end 38. In the embodiment shown, upper end 37 defines an opening 39, which allows a user to view a portion stem 18. As shown in FIGS. 1-2, lower end 38 of mount 12 may be substantially open. Alternatively, as shown in FIGS. 3, 5 and 6, lower end 38 may comprise a lower surface 41. Opening 36 may be sized to allow stem 18 to move between upper end 37 and lower end 38 of mount 12 when stem 18 pivots In some embodiments, upper end 37 further comprises pivot stop 41, for preventing serving implement 14 from pivoting excessively. For example, if a relatively large weight of material is placed in bowl 14, serving implement 14 will tend to pivot such that bowl 14 moves downwardly and opening 22 faces downwardly. This may result in material spilling from bowl 20. Accordingly, pivot stop 41 serves to contact stem 18, and prevent serving implement 14 from rotating to a point where material will spill from bowl 20.

In the embodiments shown, stem 18 is mounted to a fulcrum or pivot axle 46, which extends between longitudinally extending sidewalls 30a and 30b. Stem 18 may be mounted to fulcrum 46 by any means known in the art. In one particular embodiment, stem 18 and fulcrum 46 may be integrally formed. Sidewalls 30a and 30b each comprise an opening 47a, 47b, through which first 50a and second 50b ends of fulcrum 42 extend. In other embodiments, fulcrum 46 may be pivotally mounted to sidewalls 30a and 30b by other means. For example, first 50a and second 50b ends of fulcrum 46 may comprise screw-threads (not shown), and first and second bolts (not shown) may be secured to the end regions. Alternately, pivot axles may extend inwardly from sidewalls 30a, 30b and be pivotally received in mating openings provided in serving implement 14.

Weighing serving implement 10 further comprises a mechanical counterforce-providing member 52. Mechanical counterforce-providing member 52 serves to provide an opposing force to a downward force provided by contents (food) supported by head 16. That is, e.g., when material is placed in bowl 20, serving implement 14 will rotate about pivot point 40 such that bowl 20 moves downwardly. Mechanical counterforce-providing member 52 serves to oppose this motion.

In the embodiments of FIGS. 1-4, mechanical counterforce-providing member 52 is a counterweight 54, which is associated with the second portion 44 of stem 18. In the embodiment of FIGS. 1 and 2, counterweight 54 is provided adjacent rear end 26b of second portion 44, on an underside of stem 18. In alternate embodiments counterweight may be positioned elsewhere one second portion 44, for example on an upper surface of stem 18. Counterweight 54 may be affixed to stem 18 by any means known in the art. In one particular embodiment, stem 18 and counter weight 54 are integrally formed. Alternately, it may be secured thereto by welding, mechanical fixation means (e.g., screws) an adhesive.

In an alternate embodiment, second portion 44 itself may be the counterweight. That is, the weight of second portion 44 may provide the opposing force to a downward force provided by contents in supported in the head.

In the embodiment of FIG. 1, counterweight 54 is received within mount 12. In another embodiment, as shown in FIG. 3, a portion of counterweight 54 may be positioned on the portion 45 of stem 18 that extends rearwardly beyond mount 12.

In the embodiments of FIGS. 1-3, counterweight 54 is fixed in position relative to pivot point 40, and has a weight and is positioned such that when a given weight of material is placed in bowl 20, and mount 12 is positioned such that serving implement 14 is allowed to pivot, serving implement 14 will rotate about pivot point 40 until stem 18 moves to a present balance position, e.g. stem 18 becomes horizontal. In other words, weighing serving implement 10 is configured to weigh a pre-set amount of material. For example, in one particular embodiment, counterweight 54 may have a weight and be positioned to exactly counter downward forces applied when 25 g of material is placed in bowl 20. In such an embodiment, a user may place material into bowl 20, and if stem 18 moves to a horizontal rest position, this indicates to the user that 25 g of material is in bowl 20.

In some embodiments, counterweight may be removable from stem 18. For example, weighing serving implement 10 may be provided with a plurality of counterweights, which may be attached to and removed from stem 18. Each counterweight may be associated with a given preset weight. For example, weighing serving implement 10 may be provided with two counterweights. One of the counterweights may be sized to exactly counter downward forces applied when, e.g., 50 g of material is placed in bowl 20. The other of the counterweights may be sized to exactly counter downward forces applied when, e.g., 100 g of material is placed in bowl 16. In such embodiments, counterweights 54 may be removably attachable to stem 18 by any means known in the art. For example, counterweights 54 may be magnetically affixable to stem 18 or secured there to by a set screw.

In some embodiments, counterweight 54 may be movable with respect to pivot point 40. For example, referring to FIG. 4, counterweight 54 comprises a slot 56 through which stem 18 is inserted. Stem 18 further comprises markings 58, which provide a weight scale. When material is placed in bowl 20, and mount 12 is held such that serving implement 14 is allowed to pivot, counterweight 54 may be slid along stem 18, until stem 18 is horizontal. When stem 18 is horizontal, a user may read markings 58, to determine the weight of the material in bowl 20. Alternately, a set screw may be provided such that a preset weight may be selected.

As previously mentioned, when using the weighing serving implement 10 of FIGS. 1-4, a user may be required to determine whether stem 18 is horizontal. That is, in use, mount 12 is held in an essentially fixed position, and serving implement is allowed to pivot about pivot point 40. If stem 18 pivots to an essentially horizontal position, this indicates that a given weight is supported by head 16. In some embodiments, weighing serving implement 10 may be provided with means for aiding a user in determining when stem 18 is horizontal. For example, in the embodiment of FIGS. 1-4, upper end 37 of mount 12 is substantially flat. Thus, if a user holds mount 12 in an essentially horizontal position, such that sides 30a and 30b are horizontally extending, the user may determine if stem 18 is horizontal by determining if stem 18 is aligned with upper end 37. Alternatively, or in addition, mount 12 may be provided with markings, such as a line on the inside of a sidewalls 30a, 30b, or other members with which stem 18 may align when stem 18 and mount 12 are horizontal. In any such embodiments, mount 12 may be provided with means for determining if mount 12 is horizontal. For example, a liquid level, (not shown), may be affixed to mount 12 for aiding a user in holding mount 12 in an essentially horizontal position.

In further embodiments, lower end 38 of mount 12 may provide a stable platform when weighing implement is positioned on a flat surface. For example, lower end 38 may comprise an essentially flat surface or a plurality of legs of equal length, such that when serving implement 10 is placed on a horizontal surface such as a countertop, mount 12 extends essentially horizontally. Thus, upper end 37 may extend essentially horizontally, and the user may determine if stem 18 is aligned with upper end 37.

Referring to FIGS. 5-6, an alternate embodiment of weighing serving implement is shown. As previously mentioned, in this embodiment, pivot point 40 is located adjacent rear end 26b of stem 18. Mechanical counterforce-providing member 48 is a biasing member 60, which, in the embodiments shown, is a spring. Spring 60 is positioned between lower surface 41 of mount 12, and stem 18, and exerts an upward force on stem 18. In the embodiment shown, spring 60 is positioned proximate front end 32 of mount 12. In other embodiments, spring 60 may be positioned elsewhere along the length of mount 12. Alternately, spring 60 may be a compression spring provided on one or both of the pivot axles 46.

In the embodiment of FIGS. 5 and 6, mount 12 may comprise a marking 62, which is associated with a given pre-set weight. In use, when material is placed in bowl 20, and mount 12 is held such that mount 12 extends horizontally, serving implement 14 will rotate about pivot point 40 until the upward force exerted by spring 60 equals the downward force exerted by the material in bowl 20. If the material is of the pre-set weight, stem 18 will align with marking 62. In an alternate embodiment, rather than comprising a marking indicative of a pre-set weight, mount 12 may comprise a plurality of markings, which define a scale, e.g., of weights.

In all of the above described embodiments, weighing serving implement 10 may be fabricated from a variety of materials. In a preferred embodiment, serving implement 14 is fabricated from stainless steel, and mount 12 is fabricated from a molded plastic. In an alternate embodiment, both of serving implement 14 and mount 14 are fabricated from stainless steel.

Although the described embodiments have been discussed with referenced use in the food service industry, it is contemplated that embodiments of the present invention may be used in other situations. Such uses may include, but are not limited to, household use, industrial use, or pharmaceutical use.

Thus, embodiments of the present invention provide a weighing serving implement that that allows a user to weigh material that is to be dispensed or served. Embodiments of the present invention may be advantageous because the weighing serving implement may be dishwasher safe, and may allow a user to preset the weighing serving implement to a desired weight.

It will be appreciated that mount 12 is shaped to be received in the hand of a user and accordingly may be shaped to function as a handle. Therefore, a user may manipulate head 16 as if they were holding stem 18.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. For example, the pivot point may be provided on head 16. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

I claim:

1. A weighing serving implement comprising:
   a. a mount forming a handle;
   b. a serving implement comprising a head and a stem extending from the head, the stem being pivotally mounted to the mount about a pivot point wherein said handle has a stop for said stem on a side of said pivot point opposite of said head to limit pivotal movement of said stem; and
   c. a counterweight associated with the stem;
   wherein the weighing serving implement has the ability to scoop due to said stop.

2. The weighing serving implement of claim 1, wherein the mount comprises a longitudinally extending housing.

3. The weighing serving implement of claim 2, wherein the mount has a front end, a rear end, and first and second longitudinally extending opposed sides, and the head is provided at the front end.

4. The weighing serving implement of claim 1, wherein the mount has first and second longitudinally extending opposed sides, and the stem is pivotally mounted to the first and second longitudinally extending opposed sides.

5. The weighing serving implement of claim 4, wherein the mount has a front end and a rear end, the head is provided proximate the front end, the stem comprises first and second portions on opposed sides of the pivot point, the first portion is positioned between the head and the pivot point and the counterweight is provided on the second portion.

6. The weighing serving implement of claim 1, wherein the mount comprises a lower surface configured to provide a stable platform when the weighing serving implement is positioned on a flat surface.

7. The weighing serving implement of claim 1, wherein the mount is configured for manipulating the head.

8. The weighing serving implement of claim 1, wherein the stem comprises first and second portions on opposed sides of the pivot point, and the counterweight is associated with the second portion.

9. The weighing serving implement of claim 8, wherein the second portion is the counterweight.

10. The weighing serving implement of claim 8, wherein a part of the second portion extends beyond the mount and the counterweight is provided on the part of the second portion that extends beyond the mount.

11. The weighing serving implement of claim 10, wherein the counterweight is provided on a lower surface of the part of the second portion that extends beyond the mount.

12. The weighing serving implement of claim 8, wherein the mount has first and second longitudinally extending opposed sides defining a cavity therebetween and the counterweight is provided on a part of the second portion that extends adjacent the opposed sides.

13. The weighing serving implement of claim 12, wherein the counterweight is provided on a lower surface of the part and is positioned to be received in the cavity.

14. The weighing serving implement of claim 8, wherein the counterweight is movable along the second portion.

15. The weighing serving implement of claim 14, wherein the second portion comprises a scale.

16. The weighing serving implement of claim 1, further comprising a level.

17. The weighing serving implement of claim 1, wherein the mount comprises a housing surrounding at least a portion of the stem, the head is provided at a front end of the housing and the front end of the housing has an opening through which the stem extends.

18. The weighing serving implement of claim 1, wherein the counterweight is removably positioned on the stem.

19. The weighing serving implement of claim 1, wherein at least two counterweights having different weights are provided.

20. The weighing serving implement of claim 1, wherein the mount comprises an upper surface, and the stem comprises first and second portions on opposed sides of the pivot point, and the serving implement is configured such that when the serving implement is balanced about the pivot point, the second portion is aligned with the upper surface when the upper surface is disposed horizontally.

21. The weighing serving implement of claim 1, wherein the weighing serving implement is a spoon, and the head comprises a bowl.

22. A weighing serving implement comprising:
   a. a serving implement comprising a head and a stem extending from the head;
   b. the stem being pivotally mounted to a handle about a pivot point wherein said handle has an over-limit stop for said stem on a side of said pivot point opposite of said head to limit pivotal movement of said stem, but otherwise allows said stem to remain free floating; and,
   c. a mechanical counter force-providing member configured to provide an opposing force to a downward force provided by contents supported by the head,
   wherein the weighing serving implement has the ability to scoop due to said over-limit stop.

23. The weighing serving implement of claim 22, wherein the handle comprises first and second longitudinally extending sides and at least a portion of the stem extends between the opposed sides.

24. The weighing serving implement of claim 23, wherein the handle further comprises a lower flat surface.

25. The weighing serving implement of claim 23, wherein the second portion is receivable between the opposed sides.

26. The weighing serving implement of claim 23, wherein the stem comprises first and second portions on opposed sides of the pivot point 27. The weighing serving implement of claim 22, wherein the counter force-providing member comprises a biasing member.

28. The weighing serving implement of claim 22, wherein the weighing serving implement comprises a weighing spoon, and the head comprises a bowl.

\* \* \* \* \*